(12) United States Patent
Merino Vazquez et al.

(10) Patent No.: US 10,785,267 B2
(45) Date of Patent: Sep. 22, 2020

(54) CONTROLLING SERVICES IN AN INTERNET PROTOCOL MULTIMEDIA SUBSYSTEM

(71) Applicant: Telefonaktiebolaget LM Ericsson (publ), Stockholm (SE)

(72) Inventors: Emiliano Merino Vazquez, Leganés (ES); Maria Cruz Bartolomé Rodrigo, Madrid (ES); Flor Belén Lorenzo Cabezas, Leganés (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/434,791

(22) Filed: Jun. 7, 2019

(65) Prior Publication Data
US 2019/0289040 A1    Sep. 19, 2019

Related U.S. Application Data

(63) Continuation of application No. 15/772,551, filed as application No. PCT/EP2016/076738 on Nov. 4, 2016, now Pat. No. 10,367,854.

(60) Provisional application No. 62/251,226, filed on Nov. 5, 2015.

(51) Int. Cl.
*H04L 29/06* (2006.01)
*H04W 8/04* (2009.01)
(Continued)

(52) U.S. Cl.
CPC ...... *H04L 65/1016* (2013.01); *H04L 65/1006* (2013.01); *H04L 65/1046* (2013.01);
(Continued)

(58) Field of Classification Search
CPC ............. H04L 65/1016; H04L 65/1046; H04L 67/306; H04L 65/1073; H04L 65/1006;
(Continued)

(56) References Cited

U.S. PATENT DOCUMENTS 8,537,843 B1 * 9/2013 Breau ................ H04L 65/1069
370/401
2009/0213838 A1 * 8/2009 Van Elburg ....... H04L 29/12594
370/352

(Continued)

FOREIGN PATENT DOCUMENTS

CN    103312717 A    9/2013
WO    2015158378 A1    10/2015

OTHER PUBLICATIONS

3rd Generation Partnership Project, "3rd Generation Partnership Project; Technical Specification Group Core Network and Terminals; IP multimedia call control protocol based on Session Initiation Protocol (SIP) and Session Description Protocol (SDP); Stage 3 (Release 13)", Technical Specification, 3GPP TS 24.229 V13.1.0, Mar. 1, 2015, pp. 1-873, 3GPP.

(Continued)

*Primary Examiner* — Afshawn M Towfighi
(74) *Attorney, Agent, or Firm* — Coats & Bennett, PLLC

(57) ABSTRACT

A Home Subscriber Server (HSS) stores a service profile corresponding to a subscription of a user in a memory, and configures the service profile with data used by a Serving Call Session Control Function (S-CSCF) of an Internet Protocol Multimedia System (IMS) comprising the HSS. The HSS then sets, in the S-CSCF, a timer that controls processing of a service of the user by transmitting the service profile to the S-CSCF. The S-CSCF receives the service profile from the HSS, and uses the service profile to identify a rule comprising a timer value. The S-CSCF then controls processing of the service associated with the user by setting the timer in accordance with the timer value.

17 Claims, 9 Drawing Sheets

(51) Int. Cl.
*H04W 8/18* (2009.01)
*H04L 29/08* (2006.01)

(52) U.S. Cl.
CPC ...... *H04L 65/1063* (2013.01); *H04L 65/1069* (2013.01); *H04L 65/1073* (2013.01); *H04L 67/306* (2013.01); *H04L 69/28* (2013.01); *H04W 8/04* (2013.01); *H04W 8/18* (2013.01)

(58) Field of Classification Search
CPC . H04L 65/1069; H04L 65/1063; H04L 69/28; H04W 8/04; H04W 8/18
See application file for complete search history.

(56) References Cited

U.S. PATENT DOCUMENTS

| | | | |
|---|---|---|---|
| 2010/0039930 A1* | 2/2010 | Liang | H04L 65/1016 370/216 |
| 2010/0278041 A1* | 11/2010 | Shi | H04L 65/00 370/225 |
| 2011/0131177 A1 | 6/2011 | Sheth et al. | |
| 2011/0268098 A1* | 11/2011 | Keller | H04W 36/0022 370/338 |
| 2015/0326619 A1* | 11/2015 | Lau | H04L 65/1016 370/328 |

OTHER PUBLICATIONS

3rd Generation Partnership Project, "3rd Generation Partnership Project; Technical Specification Group Core Network and Terminals; IP Multimedia (IM) session handling; IM call model; Stage 2 (Release 13)", Technical Specification, 3GPP TS 23.218 V13.0.0, Mar. 1, 2015, pp. 1-73, 3GPP.

3rd Generation Partnership Project,"3rd Generation Partnership Project; Technical Specification Group Core Network and Terminals; IP Multimedia (IM) Subsystem Cx and Dx interfaces; Signalling flows and message contents (Release 12)", Technical Specification, 3GPP TS 29.228 V12.5.0, Mar. 1, 2015, pp. 1-75, 3GPP.

* cited by examiner

CONTROLLING SERVICES IN AN INTERNET PROTOCOL MULTIMEDIA SUBSYSTEM

RELATED APPLICATIONS

This application is a continuation of prior Application No. 15/772,551, filed 1 May 2018, which was the National Stage of International Application PCT/EP2016/076738 filed 4 Nov. 2016, which claims the benefit of U.S. Provisional Application No. 62/251,226, filed 5 Nov. 2015, the entire disclosure of each being hereby incorporated by reference herein.

TECHNICAL FIELD

Embodiments herein relate to the controlling of services in an Internet Protocol Multimedia Subsystem, IMS. In particular, methods and apparatuses for controlling services in an IMS comprising a Home Subscriber Server, HSS, and a Serving Call Session Control Function server, S-CSCF, are disclosed.

BACKGROUND

The so-called Internet Protocol Multimedia Subsystem, IMS, is currently standardized by the 3rd Generation Partnership Project (3GPP). In short, the IMS comprises a technology that allow multimedia communications originated/terminated/involving users subscribed to the IMS, and wherein some of the servers belonging to the IMS are arranged to process the services of these users according to the Service Profile (SP) that is correspondingly configured in respect to these users. In a minimal implementation (i.e., considering what it is currently defined by the 3GPP Specifications defining the IMS), the SP of a user comprises at least one "Public Identifier" of the user.

Some of the relevant 3GPP Specifications defining the IMS, and defining how services related to a user are dealt with according to the SP data of their corresponding SP, are:
  3GPP TS 23.218 (which is a stage-2 specification defining a model for handing signaling of services in an IMS),
  3GPP TS 23.228 (which is a stage-2 specification defining functional entities in the IMS, their basic processing, and their interfaces), and
  3GPP TS 29.228 (which is a stage-3 specification defining protocol details for implementing the -so called- "Cx" interface between an HSS and a S-CSCF, and for structuring and coding therein the data making up the SP).

According to the 3GPP specifications defining the IMS, a service involving a user of the IMS is to be controlled (among others) by a Serving Call Session Control Function server (S-CSCF), which is assigned to process the signaling of services originating and/or terminating in said user, and which has received from a Home Subscriber Server (HSS) the SP of said user (i.e. according to the SP data received in respect to said SP). In short, the S-CSCF will process the services involving said user according to the values of the SP data received from the HSS for said user; wherein said services comprise, e.g., services originated by a terminal of said user, services terminating in a terminal of said user, or (more generally) terminating in said user. For example, in case the S-CSCF receives a signaling message requesting a service addressing a public identifier of said user (e.g., a Session Initiation Protocol message "INVITE" comprising a SIP-URL of said user) but there is not a terminal for said user registered when the message is received.

Therefore, the controlling of services in a IMS depends to a high extent on the data configured in respect to SP's, both, in a HSS and in a S-CSCF; wherein said controlling comprises, on the S-CSCF, processing the services originated/terminated services of a user according to the data of said SP's.

More specifically, the controlling of services of a certain user in an IMS comprises:
  configuring in the HSS a service profile, SP, in relationship with the subscription to the IMS of the user, the SP comprising a set of SP data usable by the S-CSCF for processing of services of said user,
  transmitting the SP data from the HSS to a S-CSCF, and
  controlling by the S-CSCF the processing of services of the user according to the SP data values received from the HSS.

It is to be noticed herein that the expressions "terminal" (of a user)" or "user terminal", which are used along the present application, do not refer to terminals necessarily operated by human users.

The FIG. 1 shows a simplified view of an architecture of an IMS, illustrating some kind of servers and their interfaces according to what it is defined by 3GPP specifications. In particular the FIG. 1 corresponds to FIG. 5.2.1 of 3GPP TS 23.218, and further comprises some reference numerals and noted interfaces.

The illustrated IMS comprises an HSS server (9100) and a S-CSCF server (9200). The IMS can also comprise, as illustrated in FIG. 1, an Application Server (AS) (9300), that can belong to the network domain of the operator owning the IMS, or that can be outside said network domain (e.g. belonging to a service provider who is not the network operator providing the IMS). In short, an AS (9300) can be a server implementing service processing logic for processing the signaling of an originating and/or terminating service involving a user of the IMS. Said AS logic can comprise, for example, diverting an originating call to a certain destination after a certain time, play a pre-recorded announcement towards the originator, rerouting unconditionally an originating call to a certain destination, etc.

For the sake of simplicity, only one instance of each kind of server (9100, 9200, 9300) is illustrated by FIG. 1; however, it is apparent that more than one instance of each of the illustrated servers may exist on a real implementation of an IMS.

The HSS (9100) and the S-CSCF (9200) communicates via the so called "Cx" interface (9192). Details of the "Cx" interface (9192) are disclosed by 3GPP TS 29.228. Using the "Cx" interface the HSS sends to the S-CSCF the SP data making up the SP of a user.

Using the "Cx" interface, therefore, the S-CSCF is thus be able to receive said SP data and, consequently, use these SP data for processing the services that involve said user. For example, this involves the S-CSCF processing the services that are originated or terminated by a user identified by said SP (e.g. signaling messages comprising a Public Identifier contained in said SP -at least one Public Identifier is defined by the SP of a user). For example, this also involves the S-CSCF processing a service terminated by a user identified by said SP even if there is not a user terminal registered for said user (e.g. signaling messages comprising a Public identifier contained in said SP when the registration status of said user is e.g. "unregistered").

An S-CSCF (9200) can communicate with a AS (9300) via the so-called "ISC" interface (9392). The functionality of the "ISC" interface (wherein ISC stands for "IP multimedia Service Control") is described e.g. by the aforementioned 3GPP Specification 23.218, and it is commonly based on Session Initiation Protocol, SIP, protocol signaling.

A quite common AS is (as contemplated by the aforementioned 3GPP Specification 23.218) a SIP-AS. In short, a SIP-AS is arranged to process the SIP signaling due to originating and/or terminating services of a user by receiving and/or sending SIP signaling messages e.g. from/to the S-CSCF assigned to said user in the IMS. A common use -cited herein as an illustrating example- comprises a (SIP-) AS arranged to: receive a message in relation to a service from/to a user (e.g. receiving a SIP message), changing some data contents of the received message -i.e. by applying its specific service processing logic-, and then sending (e.g. to a S-CSCF) the message with the modified contents. This particular case is illustrated by FIG. 2, which corresponds to FIG. 9.1.1.4.1 of the 3GPP TS 23.218.

Additionally, or alternatively, another example can comprise a (SIP-) AS arranged to receive a message in relation to a service (e.g. receiving a SIP request message), and by applying its specific service processing logic, generate and further send a different SIP message (e.g. a SIP response message). One example of this is provided in FIG. 6.3.1 of the 3GPP TS 23.218.

The rules governing the conditions for controlling a service in a S-CSCF that makes it to process a service so as to send a received message towards an AS (e.g., a SIP message via the "ISC" interface) are dictated by the so called "IFC" ("initial Filter Criteria"; FIG. 1: 9210), commonly referred along the 3GPP Specifications also as "IFC" or "iFC". More specifically: the processing of a service related to a user by a S-CSCF based on the IFC(s) that belong to the SP of the user is briefly described within the chapter 5.2.3 of the aforementioned 3GPP TS 23.218, whilst the eventual data contents of an IFC are detailed by the aforementioned 3GPP TS 29.228 (e.g.: in Annex B.2.2 -in particular by figure B.2.2.1.1-, and in Annex E -in particular in Table E.2). In short, the SP data that is downloaded to a S-CSCF from a HSS in respect to the SP of a user can comprise instances of IFCs, which content/s are going to determine in the S-CSCF how the signaling due to a service involving the concerned user is to be processed, and when a given AS is to be contacted from the S-CSCF via the ISC interface (e.g. as determined by the AS identified by the corresponding IFC's content) and, in sum, determining by the S-CSCF the control of a service in the IMS relating to said user based on the SP data received from the HSS. However, as stated earlier, the SP of a user does not need to contain IFCs, in which case the S-CSCF will control the services of a user by processing the related messages (e.g. SIP protocol messages) according to its own configured logic.

In view of the IMS related prior art cited above, it is apparent that a telecommunications system comprising an IMS may provide many advantages when coming to the issue of providing users with communication services. This is achieved by, e.g., providing a user subscribed to the IMS with a SP comprising SP data for controlling the services they originate and/or terminate. In particular, the controlling of said services can comprise forwarding the signaling messages due to any of these services from the S-CSCF to another party; for example, forwarding them to an AS.

As mentioned earlier, the ASs with which a S-CSCF of a IMS may interact can belong to the network domain of the network operator handling the IMS, or can belong to a different domain; for example, they can belong to the network domain of a third party, e.g., with which the network operator of the IMS has subscribed an agreement in respect to the control of services of some of their subscribed users.

In either case, the AS(s) that can could be contacted by a S-CSCF, as well as any other kind of terminal or server that could be contacted by a S-CSCF for accomplishing with the controlling of a service according to the SP data of a user involved/concerned by the service, may be subject or particular characteristics and/or circumstances, either: static or dynamic. Said characteristics and/or circumstances comprising, for example: capacity and availability.

Therefore, it should be desirable to devise mechanisms that, while complying with the basic frameworks defined by 3GPP specifications in respect to how services are to be controlled in IMS, allow in a more flexible manner the controlling of said services taking into account information about the parties that can be involved in a service. In other words, it should be desirable to get a more flexible handling of services in an IMS.

SUMMARY

In one aspect, the present invention provides a method for controlling services in an Internet Protocol Multimedia Subsystem, IMS, the IMS comprising a Home Subscriber Server, HSS, and a Serving Call Session Control Function server, S-CSCF. The method comprises configuring in the HSS a service profile, SP, in relationship with the subscription to the IMS of a user, the SP comprising a set of SP data usable by the S-CSCF for processing of services of said user, transmitting the set of SP data from the HSS to a S-CSCF, and controlling by the S-CSCF the processing of services of said user according to the set of SP data received from the HSS. The step of configuring the SP comprises configuring new SP data used to identify in the S-CSCF a controlling rule, said controlling rule comprising values for one or more timers for controlling by the S-CSCF the value of a time associated to the processing of services of said user. The method further comprises configuring in the S-CSCF a controlling rule, said controlling rule comprising: a rule value that maps to a value of the new SP data, and, in relationship with the rule value, values for one or more timers for controlling by the S-CSCF a time associated to the processing of services of said user; wherein the step of transmitting the set of SP data from the HSS to a S-CSCF comprises transmitting the new SP data.

The aspect above allows the services being controlled by the IMS in a more detailed manner. In particular, by defining SP values that can be mapped to specific timers by the S-CSCFs, it can be achieved a flexible behavior for controlling services in a IMS, which can be set up in respect to the SP data of, for example, a set of users which related (originating and/or terminating) services are e.g. intended to be further processed/controlled by certain servers (ASs), and, in summary, which related messages are to be sent -and further processed- by the S-CSCF and/or by any other party.

Moreover, this aspect allows the S-CSCFs of an IMS to be configured with not necessarily equal (e.g. timer) values mapping in respect to the new SP values that can be received in respect to a SP. Therefore, and in other words, a first S-CSCF can be configured to map a given value of the newly received SP data to a first value of a timer, and a second S-CSCF can be configured to map the same given value to a second value of said timer. Therefore, this aspect allow decoupling the definition of specific SP data values in the SP of a user in respect to, for example, timers set up in a S-CSCF for processing the signaling of a service relating to the user, from the specific processing -e.g. timer- parameters set out in the S-CSCF.

In a further aspect, the present invention provides a method for controlling services in an HSS of an IMS. The method comprises: configuring in the HSS a service profile, SP, in relationship with the subscription to the IMS of a user, the SP comprising a set of SP data usable by the S-CSCF for processing of services of said user, transmitting the set of SP data from the HSS to a S-CSCF. According to this aspect, the step of configuring in the HSS the SP comprises configuring new SP data used to identify in the S-CSCF a controlling rule, said controlling rule comprising values for one or more timers for controlling by the S-CSCF a time associated to the processing of services of said user; wherein the transmitting the set of SP data from the HSS to a S-CSCF comprises transmitting the new SP data.

In a further aspect, the present invention provides a method for controlling services in an S-CSCF of an IMS. The method comprises: receiving from the HSS a service profile, SP, in relationship with the subscription to the IMS of a user, the SP comprising a set of SP data which values are usable by the S-CSCF for processing of services of said user, and controlling by the S-CSCF the processing of services of said user according to the SP data values received from the HSS. The method, according to this aspect, further comprises: wherein the step of receiving from the HSS a SP comprises receiving a SP comprising new SP data that identifies in the S-CSCF a controlling rule; and further comprising the step of configuring in the S-CSCF a controlling rule, said controlling rule comprising: a rule value that maps to a value of the new SP data, and, in relationship with the rule value, values for one or more timers for controlling by the S-CSCF a time associated to the processing of services of said user.

According to one embodiment, the controlling rule further comprises, in relationship with the rule value, a service barring value, for controlling by the S-CSCF whether the user shall be de-registered.

The embodiment above allows, for example, to de-register in an easy manner to all the set of IMS users which SP states the service barring value. This further allow the resources in (or by) a IMS to be controlled in a more detailed manner because, for example, some users being currently assigned to a certain S-CSCF which needs to be put out of service, or replaced by other, or users which communications are held by an AS which needs to be put out of service, or replaced by other, are de-registered; thereby asking these users to (re-)register again. Accordingly, by combining the setting of new SP data with the corresponding processing in the (eventually new or modified S-CSCF or AS), the affected users, after (re-)registering, will get their services controlled according to the current outstanding SP data. This is achieved in a simple manner in the concerned S-CSCF(s) by just sending a specific message that conveys the value of the SP data which rule value(s) comprises said "service barring" value. The present embodiment also provides a more flexible handing of the S-CSCFs and/or ASs within the IMS since, by simply marking as "service barring" the SPs of a certain set of users, it can be obtained an easy manner of re-assigning these users to other S-CSCFs and/or ASs.

According to one embodiment, the one or more timers comprise at least one of: a Session Initiated Protocol, SIP, related timer for controlling times dealing with SIP protocol messages that convey signaling of a service originated by or terminating in said user, a re-registration timer for controlling the time in which the user must re-register in the IMS, and an Original Dialog Identifier, ODI, validity timer for controlling the validity of an ODI.

According to one embodiment, configuring in the HSS a SP comprising the new SP data comprises at least one of: configuring the new SP data as a first information element belonging, as an attribute, directly from the data class defining said SP, and configuring the new SP data as a second information element belonging, as an attribute, to the data class that, belonging to the data class defining said SP, defines an Initial Filter Criteria, IFC; and wherein configuring in the S-CSCF a controlling rule comprising a rule value that maps to a value of the new SP data further comprises at least one of: configuring in the S-CSCF a rule value that maps to a value that can be received in said first information element and configuring in the S-CSCF a rule value of that maps to a value that can be received in said second information element.

According to one embodiment, configuring in the S-CSCF a controlling rule comprising a rule value that maps to a value of the new SP data further comprises at least one of: configuring a rule value that maps to a value that can be received in a first information element, and configuring a rule value that maps to a value that can be received in a second information element; wherein said first information element belongs, as an attribute, directly from the data class defining said SP, and wherein said second information element belongs, as an attribute, to the data class that, belonging to the data class defining said SP, defines an Initial Filter Criteria, IFC.

In further aspects, the present invention provides an apparatus implementing a Home Subscriber Server, HSS, and an apparatus implementing a Serving Call Session Control Function server, S-CSCF.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
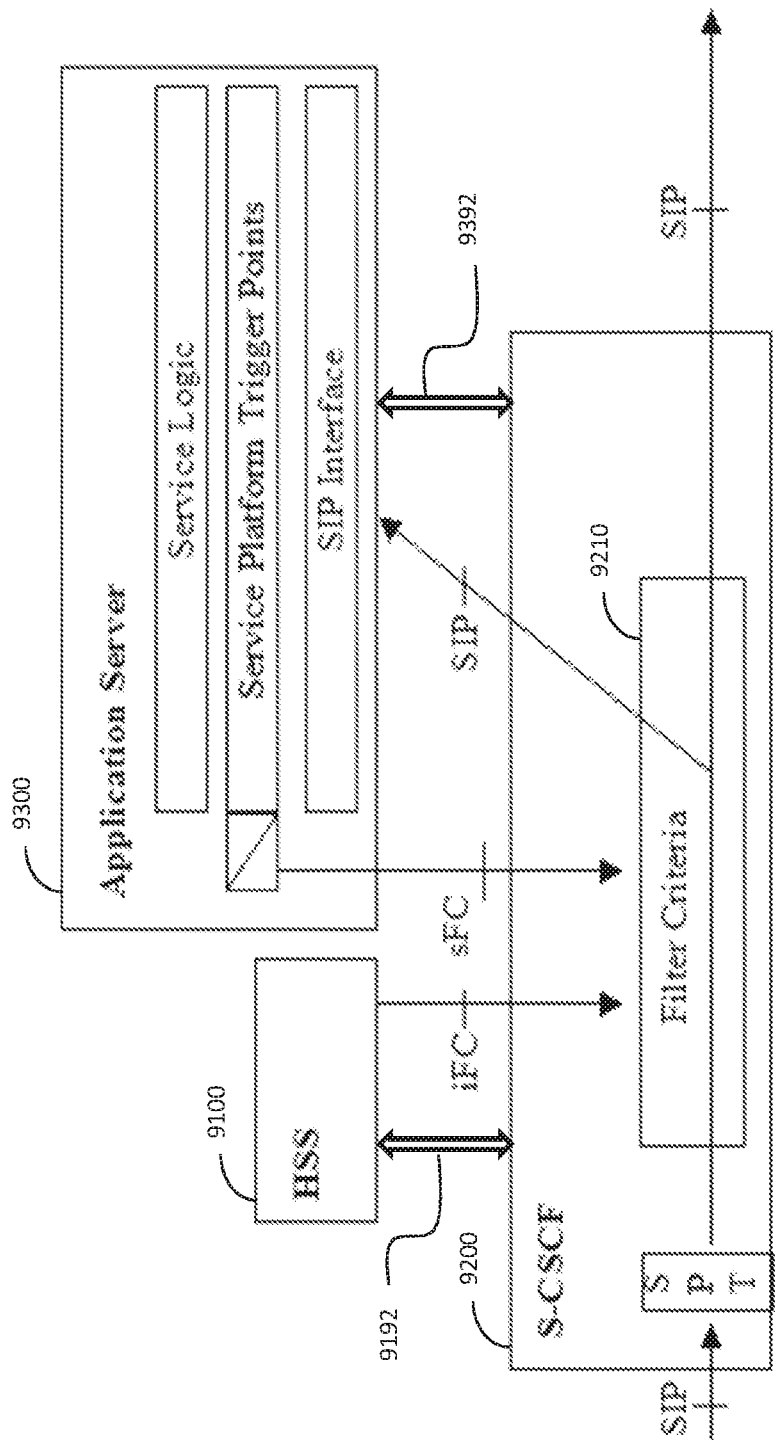
FIG. 1 shows a simplified view of an architecture of an IMS, illustrating some servers of an IMS and their interfaces, according to the prior art.

The following description is provided for illustrating embodiments of the present invention by way of examples described in respect to these embodiments.

In the described embodiments, the present invention provides with a flexible manner to control services in the IMS of a telecommunications network; and, for example, addressing to the problem of how the services in the IMS of a telecommunications network can be adapted depending on the characteristics and circumstances of the involved servers. In particular, the present invention provides with new information that (optionally) can be configured in, either or both: directly belonging to the "Service Profile" (SP) associated to the "IMS subscription" data, or associated to the "IFC/s" that could belong to said SP.

The eventual values that can take the one or more new information elements that store or convey said new information are to be mapped within the corresponding (receiving) S-CSCFs to one or more parameters that are previously configured in the S-CSCF, and that govern how the S-CSCF processes a service; in particular, parameters (such as timers) that govern/control how to process in the S-CSCF the signaling due to a service originated and/or terminating in a user of the IMS, and/or how the events occurring in said service processing (as per said signaling) are to be processed therein. The mapping between: a specific value received in any of the new information elements conveying the new information, and the corresponding (configured) governing parameter/s in the S-CSCF receiving them, needs not to be the same all over all of the eventual S-CSCFs that are in the network of an IMS operator, nor all over the S-CSCFs belonging to different IMS operators. This allows a high degree of flexibility on, both, a per S-CSCF basis, and on a per operator basis, in respect to service processing in IMS.

In particular, the -one or more- SP/s associated to the "IMS subscription" data of a user, or to the "IFC/s" that could belong to said SP/s, are first configured in the corresponding HSS (e.g. the HSS that upholds the "IMS subscription" data of said user). Said HSS's configuration comprises adding (optionally) new values for the new information of the SP and/or IFCs belonging to said SP. Then, the corresponding SP, comprising also the new information, is -according to the prior art procedures- downloaded from the HSS to the S-CSCF that will attend to a service originating and/or terminating in the concerned user. Subsequently, the S-CSCF, when processing a service from/to the user, will enforce the received new information by selecting the (therein pre-configured parameters—e.g. timers, etc.) that correspond to the received value of the received new information.

Accordingly, embodiments of the invention provide operators with a flexible mechanism to classify the services and/or Application Servers offering each service so that the network is aware and can apply, e.g., different SIP timers, or behavior when triggering services, or re-registration policies during IMS registration, etc.

This classification can be managed by the operator via configuration in the HSS when defining the one or more Service Profile/s (SP) associated to the IMS subscription data of a user (including IFC/s configuration of the eventual IFCs that could belong to said SP/s).

In particular, according to embodiments of the present invention, new information is added to, either or both: within the data belonging directly to the SP(s) of a user, and/or within the data pertaining to the IFC(s) that could belong to said SP(s). The eventual values that can take said new information are also configured in one or more of the S-CSCFs of the network, each eventual value in relationship with one or more internal parameters that are also configured in each S-CSCF and that govern how the S-CSCF has to process a service originating or terminating in a certain user (e.g. such as: protocol timers, parameters controlling signaling dialogs, re-registration timers, etc.).

It is to be noticed that the same "value" that can take the new information (e.g.: value "5", value "B", value "3C") does not necessarily match to, either or both: the same governing parameters in all the S-CSCFs, nor to the same values for the -eventually- coincident governing parameters. For example, a given value (e.g. "5") can be related to a first timer in a certain S-CSCF (e.g. S-CSCF-1) and to a second timer, or to a different governing parameter in another S-CSCF (e.g. S-CSCF-2). This allows a great degree of flexibility to operators of IMS networks in respect to configuring their systems, since they are not required to a -say- "standard agreement" in 3GPP stage-3 specifications of the respective values in relationship with specific S-CSCF's governing parameters.

The new information will -according to the known art disclosed by 3GPP specifications dealing with IMS- be downloaded to S-CSCF during registration as a part of the SP that correspond to the user. Namely, the present invention does not introduce any change in the currently standardized mechanisms to download and/or update the SP of a user in a S-CSCF; but just introduce some new data in the content of said SP.

The mechanisms provided herein are generic enough so that each service type is mapped in the network (in this particular case, in S-CSCF) to an extensible set of parameters instructing how the network (and, in particular, how a S-CSCF) has to behave in certain situations for a specific service/AS triggered, or e.g. even indicate how often the service requires to receive re-registrations from the user equipment, UE, (regardless of the access the UE is using, e.g. LTE, Wi-Fi, etc.).

Also this allows the operator to perform certain operation and maintenance (O&M) actions based on the service, rather than on the type of user, e.g. if a service is causing problems, the operator can force a network initiated de-registration so that users associated to a specific SP and/or IFC (i.e. AS) are de-registered (e.g. and a subsequent initial registration should take place for these users). Even the operator can also prohibit users associated to a SP and/or IFC (i.e. AS) from using the network (the IMS network) whenever the service is causing massive signaling/issues which are affecting all users in the whole network.

It is, thus, an implementation choice in the different network elements (e.g. on a per S-CSCF basis, and/or in a IMS's operator basis) how to map the classification of each service/AS configured in the HSS to a set of configurable aspects (e.g. specific SIP timers, behavior when triggering ASs, etc.).

The foregoing description will provide further details about some of the embodiments above.

The embodiments of the invention can provide the following advantages:

- Allowing a dynamic specific parameter setting (e.g. specific SIP timers being dynamic, rather than static) in the network to operators on a per user/service/AS basis, avoiding changes that can impact other ASs in implementations with global configurations.
- Allowing a higher flexibility to adapt to different AS vendors -e.g. on a per AS/IFC basis-, even allowing to differentiate the behavior of a S-CSCF even between the ASs that provide the same service (i.e. based on a per AS/IFC parameter distinction).

Allowing operators to perform O&M procedures (e.g. forced re-authentication, graceful de-registration) based on the services subscribed for each user in both HSS/CSCF. Thereby, the operator of a IMS network is provided with a simplified tool allowing to e.g. put out of traffic to one or more ASs by simply setting a certain value on the SP (or related IFC/AS data) of one or more users, and sending the corresponding SP update to the concerned S-CSCF/s.

Before going into details of the solution, a background and problem description is provided below.

The IMS system provides services to end users, e.g. telephony services, presence services, messaging services, etc.

In IMS there's a kind of service layer where Application Servers (AS) execute the necessary application service logic so as to provide end users' services. This is accomplished -among other- by the ASs exchanging signaling messages with nodes of the IMS; among these nodes there is the so called CSCFs. The CSCF node invokes services over the ISC interface (i.e. a reference point/interface defined between a S-CSCF and a AS), and each Application Server hosting the different business/service logic may have different impacts in the network upon failures, redundancy, routing, etc.

Figure 2:
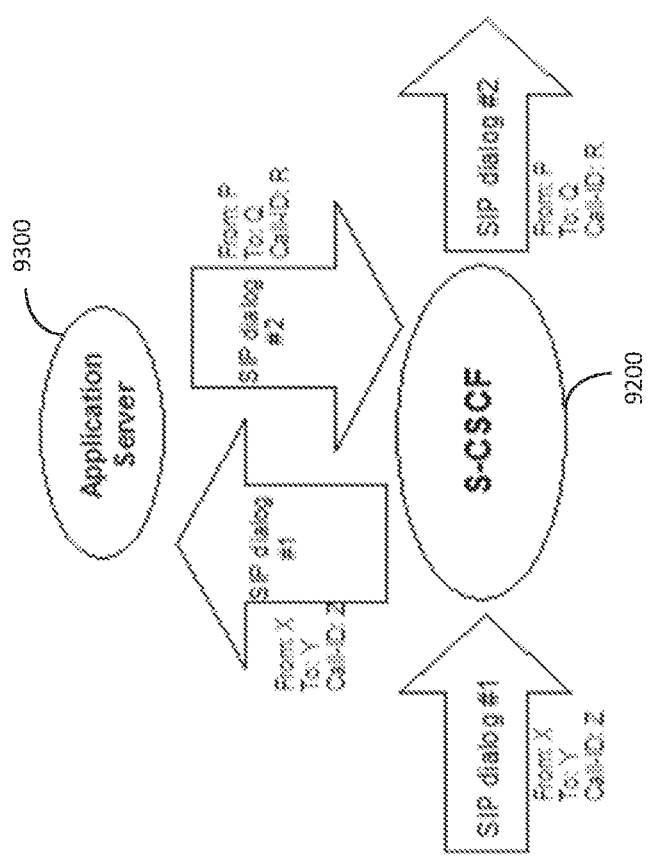
FIG. 2 shows a way of processing services in the IMS between servers, according to the prior art.

As shown in FIG. 1 -and as commented earlier- the data defining the way how a service invoked through the IMS in respect to an involved party in said service is to be processed is, first, configured in the form of the so called IFC (Initial Filter Criteria) in the HSS and, then, later provided from the HSS to CSCF during IMS registration. Hence, the processing of a service by a CSCF may involve interactions with at least one Application Server (i.e. as specified by the corresponding IFCs) via SIP protocol; for example. as shown in FIG. 2.

However, with the introduction of services such as the so called "Voice over LTE" (VoLTE, wherein "LTE" stands for "Long-Term Evolution") and the increasing number of applications/services in IMS, together with the different vendors/technologies offering services (i.e. as implemented by the different Application Servers, AS), each service and/or AS devoted to provide a service may put different requirements in the network nodes (in this case, e.g., the CSCFs), and currently there is no way to distinguish what to do -with enough granularity- based on each service/AS (e.g. to decide when the service is not available), neither to provide the network for some granularity to perform certain actions initiated by the operator (e.g. re-authenticate users associated to a specific service).

In particular, Application Servers (AS) interacting with IMS servers (typically with S-CSCF servers over the "ISC" reference point/interface) typically implement -among other- end user services. A S-CSCF node invokes services over the ISC interface according to the configured IFCs (Initial Filter Criteria) per IMS Subscription, what means that the S-CSCF applies a unique behavior on a per Private/Public Identity pair basis as defined in the SP, regardless the specific needs/characteristics of each Service and/or Application Server. However, each Service or each Application Server hosting the different business/service logic may require different action by the S-CSCF, for example, execution of different timers, decision of either session dropping or continuation, selective re-authentication of users before accessing the services, etc.

Nowadays, the S-CSCF applies a unique behavior per user, then a granularity per Service Profile and/or Application Service is not currently supported.

Along this disclosure the expression "Service and or Application Service (AS)" (or similar, such as "services and/or Application Servers") appears in the context of problem or solution statements. In this respect a short clarifying discussion is provided below:

In the IMS the way a service, either, initiated by a user or terminating to a user, is to be processed is conditioned by the -so called- "Service Profile" (SP) that correspond to the IMS subscription of said user and, more in particular to the SP that corresponds to the Public Identity (also referred as Public Identifier) that identifies said user for said service. That's apparent e.g. from the figures B.1.1 and B.2.1 in 3GPP specification TS 29.228. Further, belonging to the same SP of a user, there can be more or more of the so called "Initial Filter Criteria" (IFCs), each specifying an identifier of the Application Server (AS) that should handle the corresponding application service. That's also apparent from the figure B.2.2.1.1 in 3GPP specification TS 29.228 -which follows from the previously cited figures B.1.1 and B.2.1 in the same 3GPP specification-.

Therefore the expression "Service and or Application Service (AS)" (or similar expressions, such as "services and/or Application Servers") recited along the present disclosure refer, respectively, to information in the SP of a user, and/or to information in the IFC(s) that belong to the SP of said user.

A conclusion in view of the prior art is that there is no mechanism to classify the services (and/or Application Servers) so that the network can act upon the type of service in a specific way and different from another service (e.g. in this respect, the present disclosure provides the feature of apply different SIP timers to each service; for example on a user service profile basis, or in an AS profile basis). In the same manner, the operator has no way either to perform certain Operation and Maintenance actions affecting e.g. only to a given service.

Figure 3:
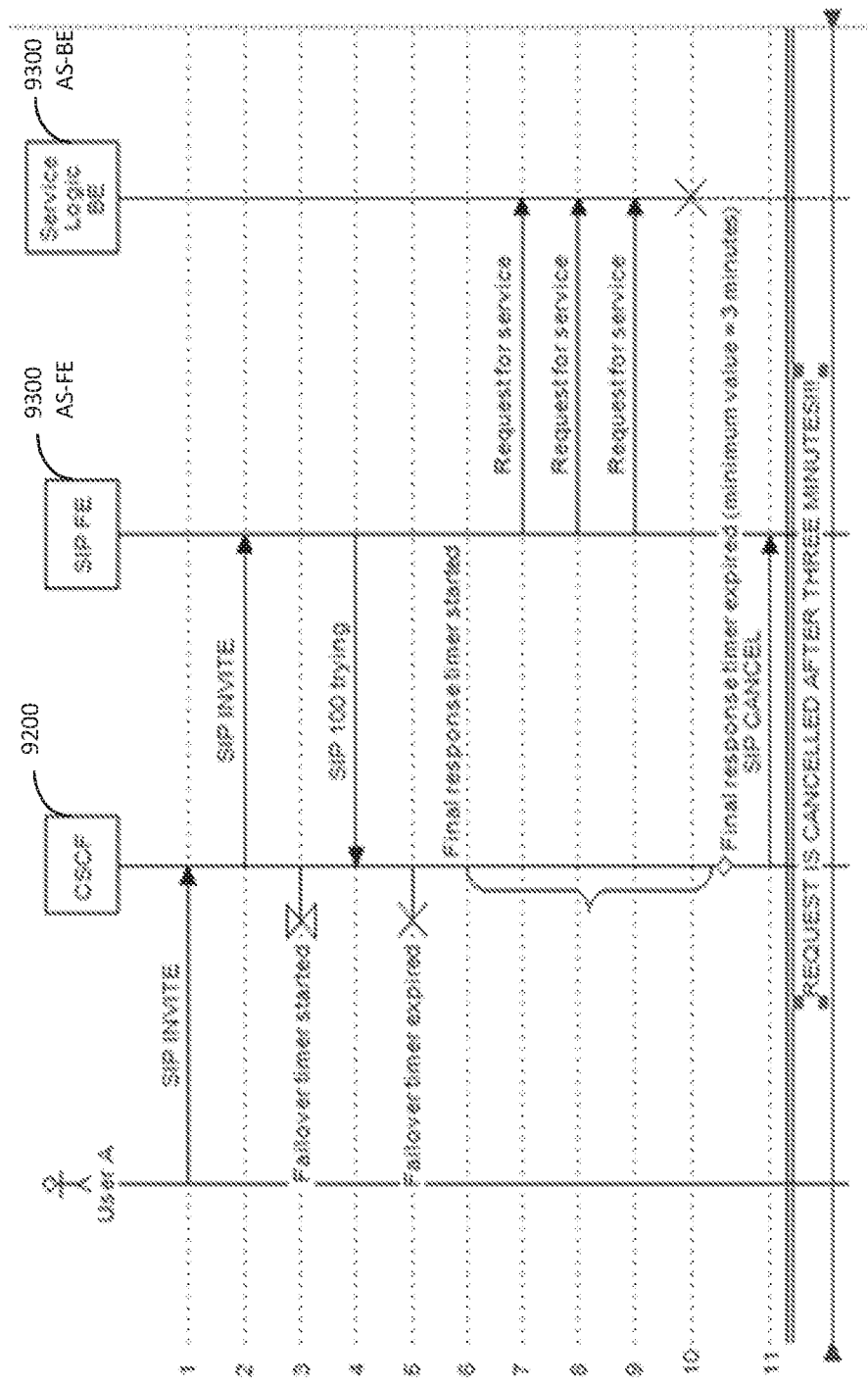
FIG. 3 shows a schematic signaling diagram illustrating how a service for a user is controlled, and the corresponding processing by the servers, according to the prior art.

The FIG. 3 illustrates a problem example, occurring according to the prior art. The same FIG. 3 will be later used to disclose how that problem can be fixed according to the embodiments of the present invention.

The scenario illustrated by FIG. 3 comprises a particular network implementation case wherein -e.g. due to AS's server resource allocation policies- the functionality of a certain AS is split between: one or (likely) more than one SIP Front End (FE) servers (9300 AS-FE) -dealing with interfacing SIP signaling with the CSCFs-, and one or more Back End (BE) servers (9300 AS BE) implementing the service logic corresponding to the particular AS. Nevertheless, the problems described herein can also appear in other (i.e. more simple) network implementations, wherein e.g. the CSCF communicates directly with a server implementing the corresponding AS (i.e. no FE and BE servers, but a simple e.g. monolithic AS server implementing, both: the signaling interface towards the CSCFs, and the service logic of the corresponding AS/service). Similarly, some of the solution embodiments described herein are described -for the sake of illustration purposes- with the same kind of (say) same complex implementation as the one illustrated by FIG. 3. However, the basic features disclosed by the solution of this invention can equally be applied without any substantial change to more simple implementations of the AS (e.g. monolithic AS server implementation).

In other words: the FIG. 3 shows a kind of AS server deployment implementation wherein its CSCF's interface signaling and its processing -and further signaling- appears divided along -say- two functional boxes (referred herein as, respectively: "SIP FE" (9300 AS-FE) and a "Service Logic BE" (9300 AS-BE). However, both, the problems illustrated herein, as well as features of the solutions provided by this invention, can equally apply to situations wherein a CSCF interfaces directly with the server/s machine/s implementing a AS (9300) (i.e. a AS that comprises the capabilities to receive and send SIP signaling and, at the same time, that comprises the service logic for processing said signaling without the signaling mediation of a SIP-FE).

According to the example illustrated by FIG. 3, a service is offered by an AS in many foreign countries, and each operator has a local/regional SIP front-end (e.g. 9300 AS-FE) but the service logic is centralized in a Service Logic back-end (9300 AS-BE). This is shown in FIG. 1 as a SIP Front-End (SIP FE) server -interfacing SIP signaling via the "ISC" interface with CSCFs-, and Service Logic BE server -executing the service logic of the corresponding AS). This kind of implementation may cause unusual (but also frequent) scenarios of failure due to non-specific timers or logic applied.

Nevertheless, and as commented earlier, the problems described herein can also appear in other (i.e. more simple) network implementations, wherein e.g. the CSCF communicates directly with a server implementing the corresponding AS (i.e. no FE and BE servers, but a simple e.g. monolithic server implementing, both: the signaling interface towards the CSCFs, and the service logic of the corresponding AS/service.

The FIG. 3 shows a schematic signaling diagram example illustrating how a service of a user is controlled, and the corresponding processing by the servers, according to the prior art. The same figure will be used later for illustrating how a service for a user is controlled, and the corresponding processing by the servers, according to the present invention.

FIG. 3, flow 1: User A initiates a service in the IMS. For example, an IMS call towards another party is signaled from user A by means of a SIP message INVITE.

FIG. 3, flow 2: The S-CSCF triggers AS after performing IFC (Initial Filter Criteria). In this specific example, the S-CSCF sends the received SIP message INVITE to the AS set out in the IFC specified in the SP of the user A.

It is to be noticed that the triggering of a certain AS (as illustrated) is determined in the S-CSCF depending on the content of the IFC of the SP of "User A"; wherein said SP is the one selected (e.g. among the multiple ones that can be related to the subscription of said user, and stored by the HSS) according to the one previously downloaded from the HSS to the S-CSCF when said S-CSCF was assigned to serve the processing of their originating and/or terminating services.

FIG. 3, flow 3: A pre-configured failover timer in started in S-CSCF.

FIG. 3, flow 4: The AS (SIP FE in the AS in this particular case) returns a "SIP 100 trying" message, so as to stop by the sender (i.e. by the S-CSCF) retransmissions of the SIP INVITE message. The "SIP 100 trying" message is considered as a provisional response.

FIG. 3, flows 5 and 6: Since the AS sent back a provisional response, S-CSCF stops failover timer and starts another timer so that if not final response is received the request is rejected/progressed, depending on the IFC configuration. Commonly, the SIP timer "C" is started.

FIG. 3, flows 7-9: The SIP FE in the AS attempts unsuccessfully a service request from the AS BE. For example, this can be due to connectivity problems between the different geographical regions where the FE (9300 AS-FE) the BE (9300 AS-BE) are located.

FIG. 3, flow 10: The final response is not received by the S-CSCF. The minimum value allowed for receiving a final response, as well as other SIP related timers, are set in the S-CSCF according to the dictations of IETF RFC 3261, which defines the SIP protocol and their related timers. In this case, the applicable timer is timer "C". The timer "C" according to RFC 3261 must last at least for three minutes.

FIG. 3, flow 11: The S-CSCF cancels the request when e.g. SIP timer C expires after 3 minutes.

In short, when any communication failure occurs between the S-CSCF and any other party (being it a AS or any other kind of party), the S-CSCF is -according to the prior art- constrained by protocol defined timers, which are to be applied to any communication. The S-CSCF is, thus, according to the prior art, constrained to apply these timers. In particular, it is constrained to apply SIP protocol timers (e.g. as defined by IETF RFC 3261) to the SIP signaling of the services where it intervenes. In the example above, and according to the prior art, the S-CSCF (9200) would have applied the same SIP timer C value to any other user (any other user different from "User A" and/or to any other Application Server (i.e. to any other AS different from the couple made up of AS-FE and AS-BE, 9300).

Addressing to problems such as the one described above, the present invention provides a method allowing a more flexible solution for controlling services in an Internet Protocol Multimedia Subsystem, IMS. The method is illustrated by the simplified flowchart of FIG. 4, and it is described herein below in detail.

Figure 4:
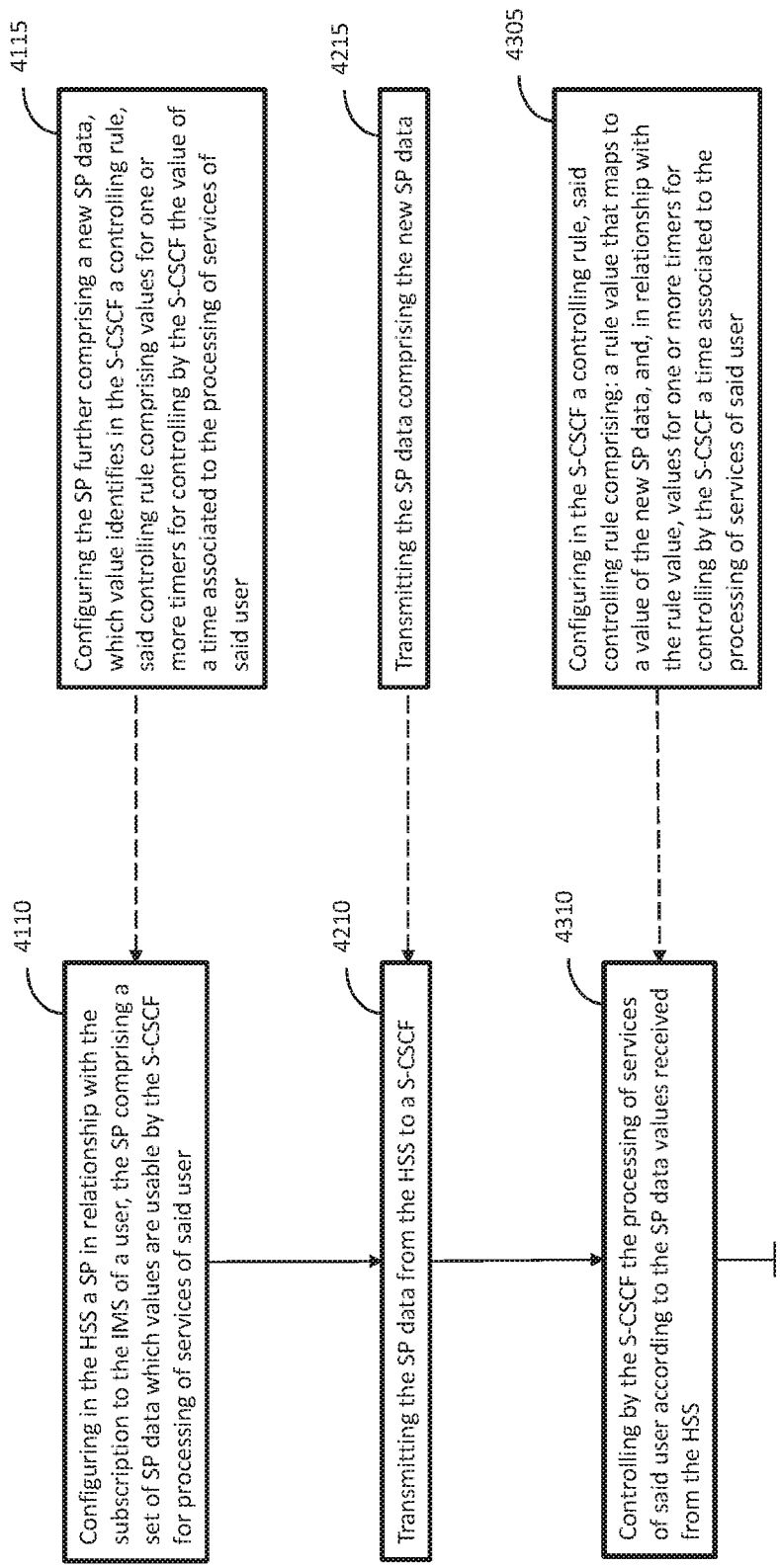
FIG. 4 shows a simplified flow chart example of a method according to embodiments of the present invention.

Since the embodiments of the present invention were devised to provide the further advantage of minimizing the impact of any implementation in IMS networks, some existing features of IMS are -efficiently and advantageously- reused in the solution provided by this invention. In view of this, and for making more clear to the reader a fair understanding how the novel features of the present invention operate in respect to already existing features, the FIG. 4 illustrates on its left side what are the features of the prior art, and on the right side novel features of the invention and their relationship with the prior-art features (as illustrated by the dashed arrows of the figure).

The numeral 4110 illustrates the step of configuring in an HSS a service profile (SP) in relationship with the subscription of a user of the IMS. This configuration step (4110) can comprise an initial configuration (e.g. the user has just acquired an IMS subscription with the operator of the IMS network), or a reconfiguration of a previously existing SP. As will be further described with reference to FIGS. 5 and 6, the SP of an IMS user comprises a variety of data, which are arranged as a plurality of simple and/or complex (substructured) information elements. Accordingly, the step 4110 can comprise setting up the whole SP data making up the SP of a certain user, or just modifying an existing value for one of these data, or just adding a new SP data that did not exist before and its corresponding value. The configuration of data in an HSS can be accomplished by a direct (e.g. local) management interface, or via a communication interface with a configuration server (e.g. an Operation Support System, or other kind of operation and maintenance server).

The intention of storing the configured SP data in an HSS of the users subscribed to an IMS is to provide them to the S-CSCF(s) that can be assigned to serve originating and/or terminating services to these users for further enforcement. Namely, the S-CSCF assigned to serve originating and/or terminating IMS based services for a user will process them (e.g. the signaling due to these services) according to the SP data contents of the corresponding SP that relates to said user. For example, the SP of a user can comprise an information element called data class "Core Network Service Authorization", which can, in turn, may comprise an information element called data class "Subscribed Media Profile Id", which value (if existing) makes the S-CSCF to filter (e.g. allow/disallow) media invoked by a service relating to the concerned user. For example, the SP of a user may comprise an information element called data class "Initial Filter Criteria" (IFC) that (as was commented earlier in the background section) is used to control by the S-CSCF when (i.e. upon what conditions) it should forward signaling due to a service related to the user is to be forwarded to an AS, and to what AS in particular.

The step 4110 commented above is further enhanced, according to embodiments of this invention. This is illustrated by step 4115. Step 4115 comprises configuring a SP of a user further comprising a new SP data, which value identifies in the S-CSCF a controlling rule, said controlling rule comprising, at least, values for one or more timers for controlling by the S-CSCF the value of a time associated to the processing of services of said user. As will be disclosed later, this step can comprise: configuring the new SP data as a first information element belonging, as an attribute, directly from the data class defining said SP, or configuring the new SP data as a second information element belonging, as an attribute, to the data class that, belonging to the data class defining said SP, defines an Initial Filter Criteria, IFC. It is to be noticed that the IMS subscription data of a user stored in an HSS can comprise, in some cases, more than one SP for the same user. Therefore, the step 4115 can comprise configuring the new SP data in any, or in all, of the SPs that may belong to their IMS subscription, and not necessarily with the same value. Thereby, allowing a high degree of flexibility when dealing with controlling services in the IMS for certain user/s.

The process illustrated in FIG. 4 continues with step 4210, wherein the SP data corresponding to the SP of a user are transmitted from the HSS to the S-CSCF, and wherein the S-CSCF receives these data, and stores them in relationship with a registration of the corresponding user (which, as commented earlier, does not need to be related to a registration of the user from a terminal, but that can be also applicable to the -so called- "unregistered" state). As illustrated in FIG. 4 by the step 4215, the step 4210 is modified so that the HSS may transmit the SP data of a user comprising also the new SP data defined according to the present invention, and so that the S-CSCF -correspondingly- can receive and store the new SP data.

The step 4310 comprises controlling by the S-CSCF the processing of services of a user according to the SP data values received from the HSS in respect to said user. As already commented, the S-CSCF is a kind of server entitled to control the services in an IMS that are originated and/or terminated by the users of the IMS. In particular, and among other, said control is accomplished for the S-CSCF by processing the signaling due to the services originated/terminated by a user according to the data contents of the SP data received from the HSS in respect to said user. As illustrated in FIG. 4 by the step 4305, the step 4310 is modified as follows. The S-CSCF is configured with a controlling rule. The controlling rule comprises: a rule value which can map to a value of the new SP data that can be received from the HSS. The controlling rule further comprises, in relationship with the rule value: at least the value of one or more for controlling by the S-CSCF a time associated to the processing of services of said user.

Figure 5:
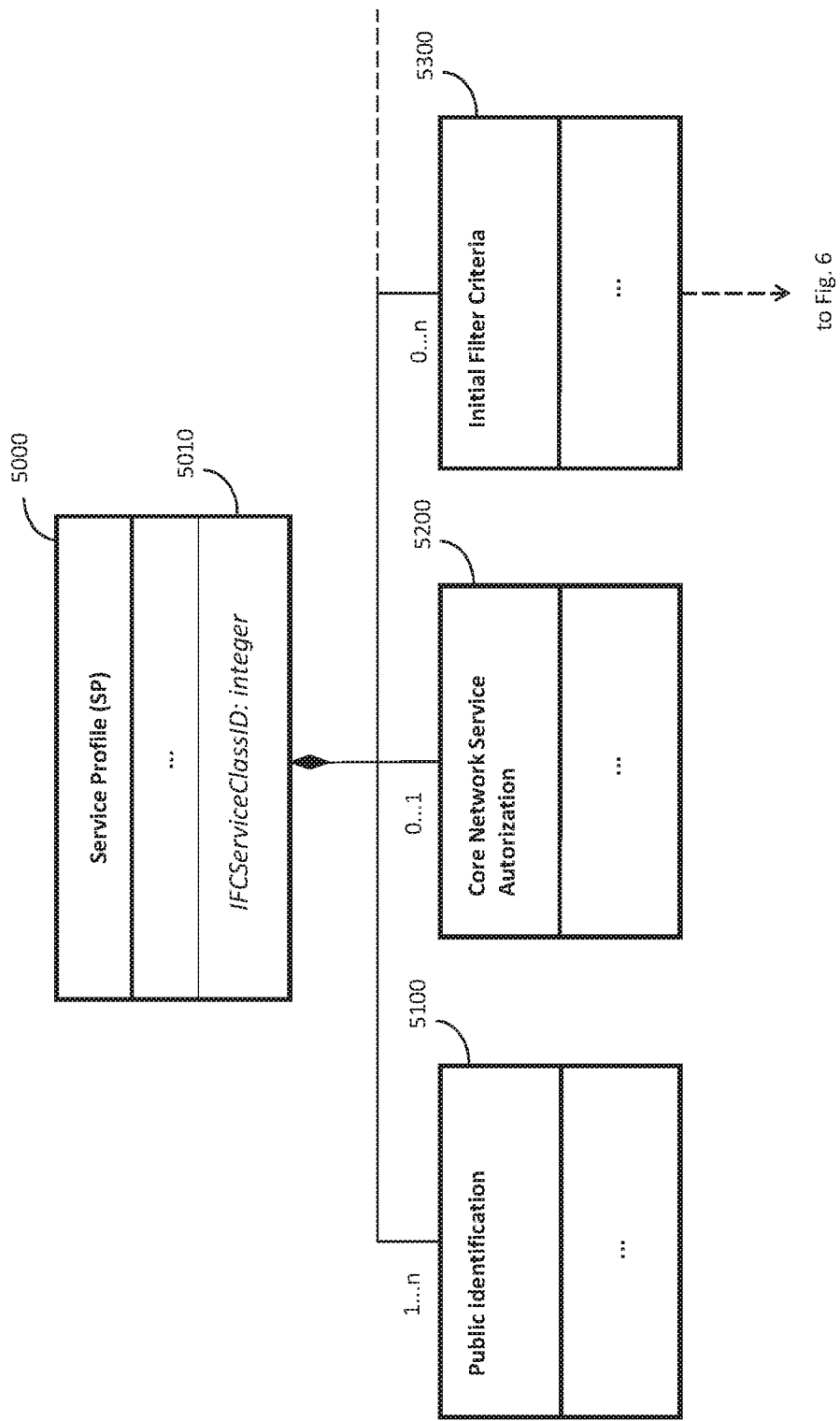
FIG. 5 shows a simplified Unified Modeling Language, UML, model example for configuring the new Service Profile data, according to a first embodiment of the invention.
Figure 6:
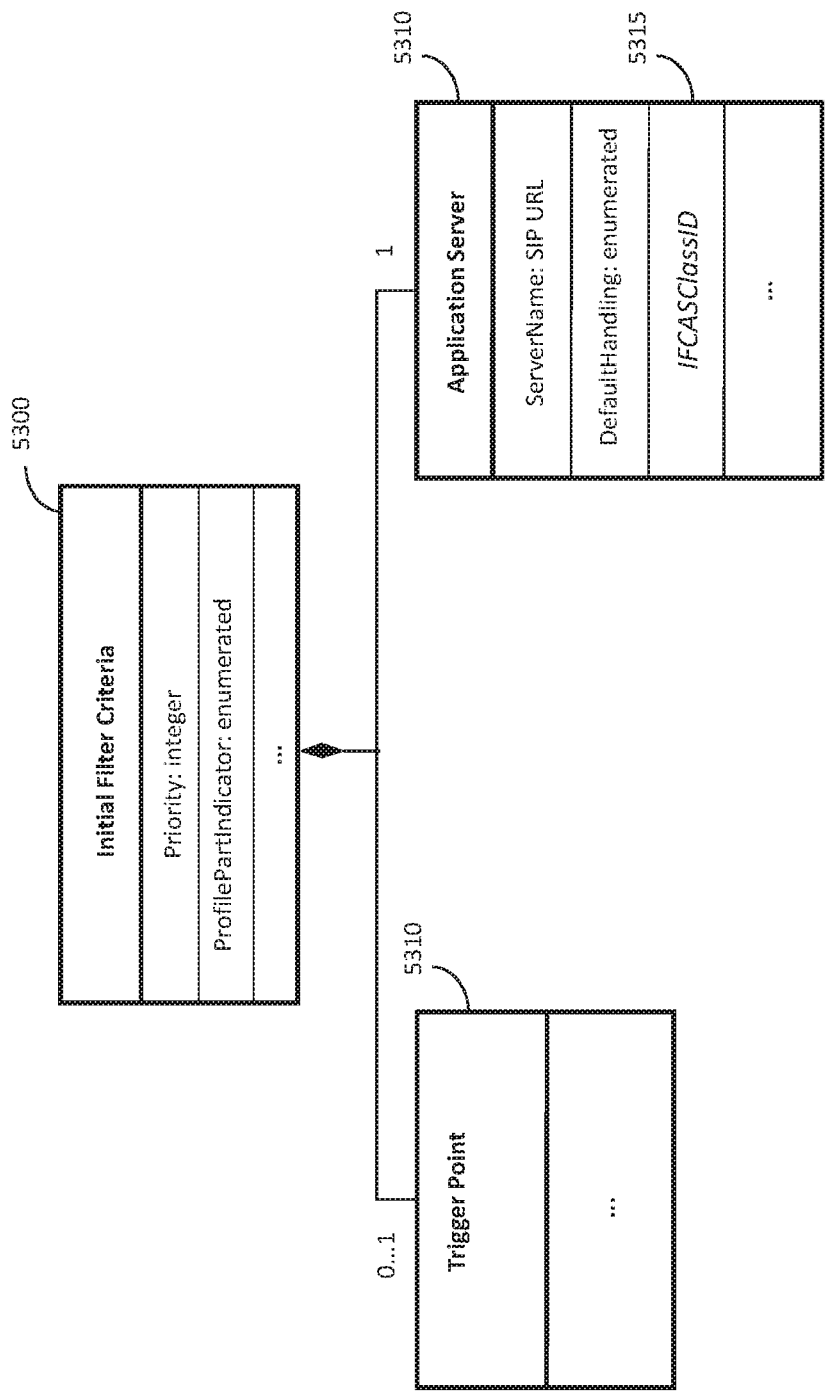
FIG. 6 shows a simplified UML model example for configuring the new Service Profile data, according to a second embodiment of the invention.

FIGS. 5 and 6 show, respectively, a first and a second simplified UML model for configuring the new SP data according to different embodiments of the invention. Both figures are based on the UML model defined by 3GPP Specification 29.228 on its Annex-B.

The FIG. 5 illustrates a first embodiment wherein the new SP data is configured as a first information element (5010, IFCServiceClassID) belonging, as an attribute, directly from the data class defining the SP (5000). As illustrated in FIG. 5, the new SP data can comprise an integer as a value.

The FIG. 6 illustrates a second embodiment wherein the new SP data is configured as a second information element (5315, IFCASClassID) belonging, as an attribute, to the data class that, belonging to the data class defining said SP (5000), defines an Initial Filter Criteria, IFC (5300). The value of the new data can -as in the previous embodiment described in respect to FIG. 5—an integer as a value.

In particular, and according to the embodiments illustrated by FIGS. 5 and 6, the following can apply:

An (optional) instance of the attribute IFCServiceClassID (5010), that identifies in the S-CSCF a set of configurable rules that specify some S-CSCF behavior variants that apply when the corresponding service is triggered, except when for the triggered Application Server includes an IFCASClassID (5315) attribute as part of the Application Server class under InitialFilterCriteria, IFC, class (5300). This embodiment is illustrated in FIG. 5.

An optional instance of IFCASClassID (5315) attribute that identifies in the S-CSCF a set of configurable rules that specify some S-CSCF behavior variants that apply when the corresponding Application Server is triggered. This attribute (5315) takes precedence over IFCServiceClassID (5010) attribute if defined in ServiceProfile class (5000). This embodiment is illustrated in FIG. 6.

The two tables below are based in the tables E.1 and E.2 of the aforementioned 3GPP Specification 29.228, which list -in respect to an Extensible Markup Language, XML, format, the information elements making up the SP of a user in respect to -respectively- complex (table E.2) and simple (table E1) data types. The two tables below show, by highlighting, details for accomplishing with the coding of the first (IFCServiceClassID, 5010) and second (IFCASClassID, 5315) information elements described above.

TABLE E.1

MODIFIED
XML schema for the Cx interface user profile: simple data types.

| Data type | Tag | Base type | Comments |
|---|---|---|---|
| tPriority | Priority | integer | >=0 |
| tProfilePartIndicator | ProfilePartIndicator | enumerated | Possible values:<br>0 (REGISTERED)<br>1 (UNREGISTERED) |

TABLE E.1-continued

MODIFIED
XML schema for the Cx interface user profile: simple data types.

| Data type | Tag | Base type | Comments |
|---|---|---|---|
| tSharedIFCSetID | SharedIFCSetID | integer | >=0 |
| tInteger | IFCServiceClassID, IFCASClassID | integer | >=0 |
| tGroupID | Group | integer | >=0 |
| tRegistrationType | RegistrationType | enumerated | Possible values: 0 (INITIAL_REGISTRATION) 1 (RE-REGISTRATION) 2 (DE-REGISTRATION) |
| ... | ... | ... | ... |

TABLE E.2

MODIFIED
XML schema for the Cx interface user profile: complex data types

| Data type | Tag | Compound of Tag | Compound of Type | Cardinality |
|---|---|---|---|---|
| tIMSSubscription | IMSSubscription | PrivateID | tPrivateID | 1 |
| | | ServiceProfile | tServiceProfile | (1 to n) |
| | | Extension | tIMSSubscriptionExtension | (0 to 1) |
| tIMSSubscriptionExtension | Extension | IMSI | tIMSI | (0 to 1) |
| | | Extension | tIMSSubscriptionExtension2 | (0 to 1) |
| tIMSSubscriptionExtension2 | Extension | ReferenceLocationInformation | tReferenceLocationInformation | (0 to n) |
| tReferenceLocationInformation | ReferenceLocation Information | AccessType | tString (NOTE 4) | (0 to 1) |
| | | AccessInfo | tString (NOTE 4) | (0 to 1) |
| | | AccessValue | tString (NOTE 4) | (0 to 1) |
| tServiceProfile | ServiceProfile | PublicIdentity | tPublicIdentity | (1 to n) |
| | | CoreNetworkServicesAuthorization | tCoreNetworkServicesAuthorization | (0 to 1) |
| | | InitialFilterCriteria | tInitialFilterCriteria | (0 to n) |
| | | Extension | tServiceProfileExtension | (0 to 1) |
| tServiceProfileExtension | Extension | SharedIFCSetID | tSharedIFCSetID | (0 to n) |
| | | Extension | tServiceProfileExtension2 | (0 to 1) |
| tServiceProfileExtension2 | Extension | IFCServiceClassID | tInteger | (0 to 1) |
| tCoreNetworkServices Authorization | CoreNetwork- ServicesAuthorization | SubscribedMediaProfile Id | tSubscribedMediaProfileId | (0 to 1) |
| | | Extension | tCNServicesAuthorization-Extension | (0 to 1) |
| tPublicIdentity | PublicIdentity | BarringIndication | tBool | (0 to 1) |
| | | Identity | tIdentity | 1 |
| | | Extension | tPublicIdentityExtension | (0 to 1) |
| tInitialFilterCriteria | InitialFilterCriteria | Priority | tPriority | 1 |
| | | TriggerPoint | tTrigger | (0 to 1) |
| | | ApplicationServer | tApplicationServer | 1 |
| | | ProfilePartIndicator | tProfilePartIndicator | (0 to 1) |
| ... | ... | ... | ... | ... |
| | | SPT | tSePoTri | (1 to n) |
| tSePoTri | SPT | ConditionNegated | tBool | (0 to 1) |
| | | Group | tGroupID | (1 to n) |
| | | Choice of  RequestURI | tString | 1 |
| | | Method | tString | 1 |
| | | SIPHeader | tHeader | 1 |
| | | SessionCase | tDirectionOfRequest | 1 |
| | | SessionDescription | tSessionDescription | 1 |
| | | Extension | tSePoTriExtension | (0 to 1) |
| tSePoTriExtension | Extension | RegistrationType | tRegistrationType | (0 to 2) |
| tHeader | SIPHeader | Header | tString | 1 |
| | | Content | tString | (0 to 1) |
| tSessionDescription | SessionDescription | Line | tString | 1 |
| | | Content | tString | (0 to 1) |
| tApplicationServer | Application Server | ServerName | tSIP_URL | 1 |
| | | DefaultHandling | tDefaultHandling | (0 to 1) |
| | | ServiceInfo | tServiceInfo | (0 to 1) |
| | | Extension | tApplicationServerExtension | (0 to 1) |
| tApplicationServerExtension | Extension | IncludeRegisterRequest | tIncludeRegisterRequest | (0 to 1) |
| | | IncludeRegisterResponse | tIncludeRegisterResponse | (0 to 1) |
| | | Extension | tApplicationServerExtension2 | (0 to 1) |
| tIncludeRegisterRequest | IncludeRegister Request | (NOTE 2) | (NOTE 2) | (0 to 1) |

TABLE E.2-continued

MODIFIED
XML schema for the Cx interface user profile: complex data types

| Data type | Tag | Compound of Tag | Type | Cardinality |
|---|---|---|---|---|
| tIncludeRegisterResponse | tIncludeRegister-Response | (NOTE 2) | (NOTE 2) | (0 to 1) |
| tApplicationServerExtension2 | Extension | IFCASClassID | tInteger | (0 to 1) |
| tPublicIdentityExtension | Extension | IdentityType | tIdentityType | (0 to 1) |
|  |  | WildcardedPSI | anyURI (NOTE 3) | (0 to 1) |
|  |  | Extension | tPublicIdentityExtension2 | (0 to 1) |
| ... | ... | ... | ... | ... |

The XML schema for the user profile as defined by 3GPP TS 29.228 can be, thus, modified as follows in respect to the modifications above (wherein excerpts of the whole user profile data in XML format are shown, and wherein modified contents are highlighted):

```
....
<xs:simpleType name="tBool">
        <xs:restriction base="xs:boolean"/>
        </xs:simpleType>
<xs:simpleType name="tInteger">
        <xs:restriction base="xs:int"/>
</xs:simpleType>
....
<xs:complexType name="tServiceProfileExtension">
        <xs:sequence>
                <xs:element name="SharedIFCSetID" type="tSharedIFCSetID" minOccurs="0" maxOccurs="unbounded"/>
                <xs:element name="Extension" type="tServiceProfileExtension2" minOccurs="0"/>
        </xs:sequence>
</xs:complexType>
<xs:complexType name="tServiceProfileExtension2">
        <xs:sequence>
                <xs:element name="IFCServiceClassID" type="tInteger" minOccurs="0" maxOccurs="unbounded"/>
                <xs:element name="Extension" type="tExtension" minOccurs="0"/>
        </xs:sequence>
</xs:complexType>
....
<xs:complexType name="tApplicationServerExtension">
        <xs:sequence>
                <xs:element name="IncludeRegisterRequest" type="tIncludeRegisterRequest" minOccurs="0" maxOccurs="1"/>
                <xs:element name="IncludeRegisterResponse" type="tIncludeRegisterResponse" minOccurs="0" maxOccurs="1"/>
                <xs:element name="Extension" type="tApplicationServerExtension2" minOccurs="0"/>
                <xs:any namespace="##other" processContents="lax" minOccurs="0" maxOccurs="unbounded"/>
        </xs:sequence>
</xs:complexType>
<xs:complexType name="tIncludeRegisterRequest">
        <xs:sequence>
                <xs:element name="Extension" type="tExtension" minOccurs="0"/>
                <xs:any namespace="##other" processContents="lax" minOccurs="0" maxOccurs="unbounded"/>
        </xs:sequence>
</xs:complexType>
<xs:complexType name="tIncludeRegisterResponse">
        <xs:sequence>
                <xs:element name="Extension" type="tExtension" minOccurs="0"/>
                <xs:any namespace="##other" processContents="lax" minOccurs="0" maxOccurs="unbounded"/>
        </xs:sequence>
</xs:complexType>
<xs:complexType name="tApplicationServerExtension2">
        <xs:sequence>
```

-continued

```
                    <xs:element name="IFCASClassID" type="tInteger"
minOccurs="0" maxOccurs="1"/>
                    <xs:element name="Extension" type="tExtension"
minOccurs="0"/>
                    <xs:any namespace="##other" processContents="lax"
minOccurs="0" maxOccurs="unbounded"/>
                </xs:sequence>
            </xs:complexType>
```

Below an example for coding the new SP data according to an XML schema for conveying SP data from a HSS to a S-CSCF (and thus, usable, both: in a HSS for configuring SP data of a user that can be transmitted to a S-CSCF, and in a S-CSCF for interpreting the SP data belonging to a user profile received from a HSS) -as disclosed by the aforementioned 3GPP Specification 29.228- is provided.

The example illustrated below considers an alternative based on the embodiment shown by FIG. 6, wherein the new SP data is configured as an optional instance of IFCASCIassID (5315) attribute that identifies in the S-CSCF a set of configurable rules that specify some S-CSCF behavior variants that apply when the corresponding Application Server (5310) is triggered according to the corresponding IFC (5300). In this example case, the information element IFCASCIassID (5315) of FIG. 6 is replaced with the information element called "AS profile".

Figure 7:
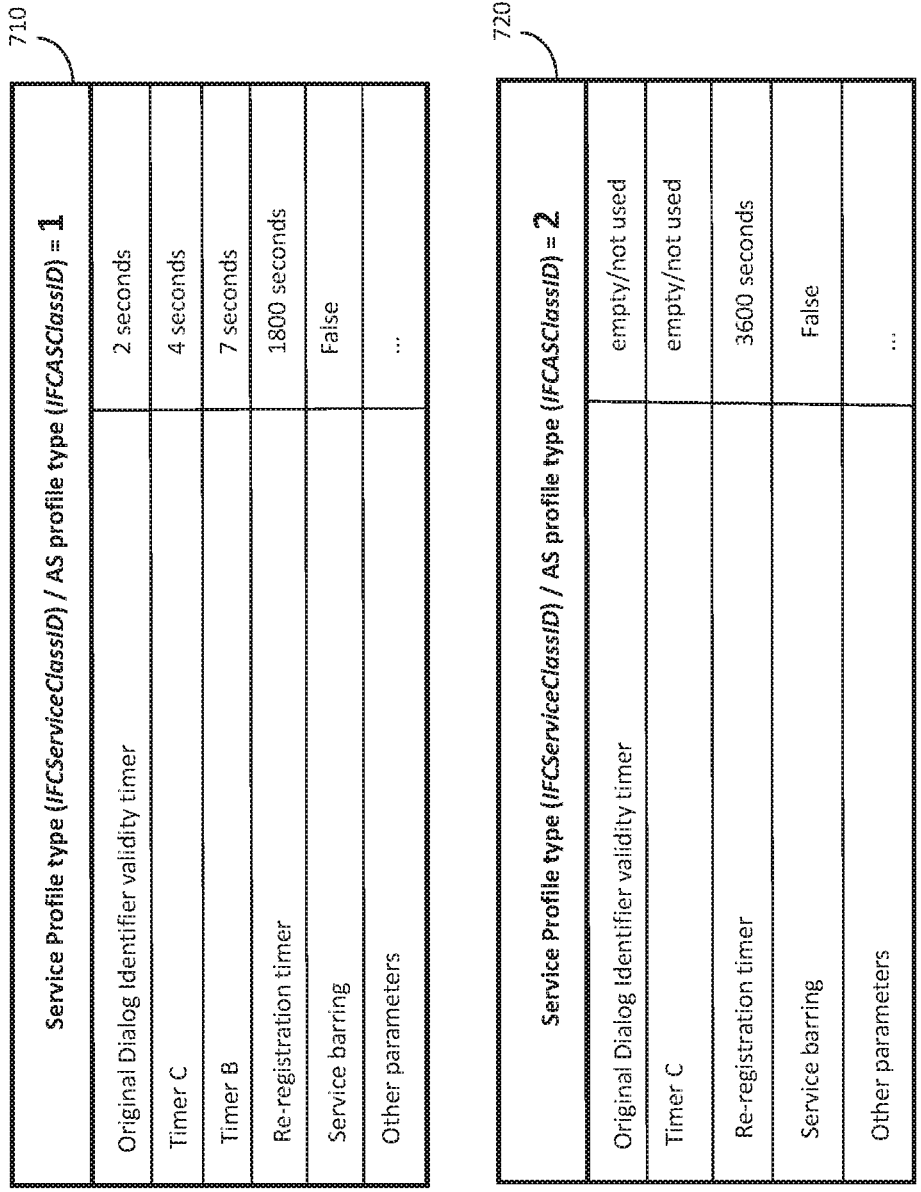
FIG. 7 shows two examples of different rule values configured in a S-CSCF, and of their corresponding parameters.

The 2 examples illustrated by FIG. 7 show how different values of a controlling rule (values=1, and =2, are shown in the figure) can be used to make the value of a controlling rule to correspond to, for example, different values of one or more controlling timers.

For example, according to the illustrated example, the S-CSCF is configured with "Timer C" with a value equal to 4 seconds in respect to the IFCServiceClassID and/or the IFCASCIassID having value #1, and with a value equal to "empty/not used" in respect to the IFCServiceClassID and/or the IFCASCIassID having value #2. This will imply that, in respect to a user served by the S-CSCF, if their SP data -as received from the HSS- specify in the new SP data the value #1, the Timer C for SIP signaling related to said user will take the value of 4 seconds -whilst for other users can take a different value-, and that if their SP data -as received from the HSS- specify in the new SP data the value

```
<?xml version="1.0" encoding="UTF-8"?>
<IMSSubscription xmlns:xsi="http://www.w3.org/2001/XMLSchema-instance"
xsi:noNamespaceSchemaLocation="CxDataType.xsd">
    <PrivateID>IMPI1@homedomain.com</PrivateID>
    <ServiceProfile>
        <PublicIdentity>
            <BarringIndication>1</BarringIndication>
            <Identity> sip:IMPU1@homedomain.com </Identity>
        </PublicIdentity>
        <PublicIdentity>
            <Identity> sip:IMPU2@homedomain.com </Identity>
        </PublicIdentity>
        <InitialFilterCriteria>
            <Priority>0</Priority>
            <TriggerPoint>
                <ConditionTypeCNF>1</ConditionTypeCNF>
                <SPT>
                    <ConditionNegated>0</ConditionNegated>
                    <Group>0</Group>
                    <Method>INVITE</Method>
                </SPT>
            </TriggerPoint>
            <ApplicationServer>
                <ServerName>sip:AS1@homedomain.com</ServerName>
                <DefaultHandling index="0" >0</DefaultHandling>
                <AS profile>1</AS profile>
            </ApplicationServer>
        </InitialFilterCriteria>
    </ServiceProfile>
</IMSSubscription>
```

In the example above, the new SP data (and its corresponding value -equal to "1" in the example- is configured as a second information element (5315, IFCASCIassID) belonging, as an attribute, to the data class that, belonging to the data class defining said SP (5000), defines an Initial Filter Criteria, IFC (5300). The bolded text highlights the coding and the eventual contents (i.e. a value "1" is cited as example), of the new information element conveying the new SP data.

Now, some examples for illustrating details for configuring in the S-CSCF a controlling rule are provided with references to FIG. 7.

2, the Timer C can, either, take a generally defined in the S-CSCF default value, or is not to be used.

The example illustrated by FIG. 7 provides an example on how different parameters making up a controlling rule for governing a service originated and/or terminated by the user to which the SP data (or the corresponding AS-IFC data) relates to. For example, within the novel information elements described by this invention, the value "1", or the value "2", in the example, could be received by a S-CSCF from a HSS (via de Cx interface) as values of the new SP data in respect to the IMS subscription data of a user to which the S-CSCF should attend in respect to -generally- their registration in the IMS and -more particularly- their originated and/or terminated services (e.g. in respect to the SP of said user, and/or in respect to one or more IFCs/ASs belonging to said SP); wherein the S-CSCF should then map the received value to a controlling rule, the controlling rule comprising one or more parameters (previously configured in the S-CSCF) that govern its processing behavior when processing said services. The example illustrated by FIG. 7 show two different controlling rules: 710 (having the rule value="1") and 720 (having the rule value="2"); wherein each of the controlling rules has their corresponding one or more values of parameters, preconfigured in the S-CSCF, and usable by the S-CSCF to process the signaling of the services originated and/or terminated by the user.

In other words, and in a short summary: If, for example, at registration of a user from a terminal, the S-CSCF receives from the HSS (e.g. at user data profile downloading through the "Cx" interface the new SP data comprising a value="1": the S-CSCF will thereafter apply the controlling rule #1 (710) and, consequently, will apply a value of 4 seconds when starting Timer C for a SIP communication related to said user.

It is to be noticed that the value of the new information elements -i.e. information elements that can convey the new SP data (e.g., according to embodiments described by FIG. 5 or 6) can take any suitable coding form (i.e., not limited to "integer" values, as illustrated in the FIG. 5 or 7). In the examples, they take the form of integers; however, any other kind of value (e.g. alphanumeric, or binary coded string, can also be utilized).

In the example, several parameters are provided just for the sake of illustration. For example, a S-CSCF is configured with the mapping between the value/s that can take the new information element/s described by the invention (e.g. with value "1" or "2", as described in the example) and with the corresponding governing parameters (as also described in the example) that map to each of these values. The S-CSCF should then behave accordingly to the parameters matching a received value of the newly defined information element/s. Namely, if a value "1" is received in respect to the SP (or in respect to the AS corresponding to a certain IFC), the SIP timer "C" will take a value of 4 seconds (according to the illustrated example), thus overriding any globally defined value defined in the S-CSCF in respect to said timer (which would -according to the prior art- apply to other -say- more general cases in which said value "1" is not stated in respect to the corresponding SP data, or in respect to further data -e.g. AS/IFC data- belonging to the SP).

As an additional information, a further explanation of some of the parameters making up the contents of the two controlling rules illustrated as examples in the FIG. 7 (710 and 720) is provided below.

The so called "Original Dialog Identifier (ODI)" is defined by the 3GPP TS 24.229 (section 5.4.3.4). In short, the ODI is an implementation specific token that the S-CSCF encodes into the own S-CSCF URI in a Route header field, prior to forwarding a SIP request to an AS. The token may identify the original dialog of the request, so in case an AS acting as a "Back-to-Back User Agent" (B2BUA) changes the dialog (e.g. as illustrated in FIG. 2), the S-CSCF is able to identify the original dialog when the request returns to the S-CSCF. By setting up a timer in relationship with an ODI the S-CSCF is provided with a powerful (and easy to configure) tool that allows it to discard late/obsolete SIP requests using the same ODI on a service profile basis, and in a flexible manner.

The timers "Timer C", and "Timer B" are well known SIP timers, and their functionality and recommended default values is described by the aforementioned RFC 3261. Nothing is disclosed, nor suggested, by the current 3GPP Specifications that describe the mandatory, or optional, IMS behavior for controlling services of their users in respect to a dynamic setting of SIP timers based on the SP data of these users. The present invention provides a solution that allow a flexible behavior that can be configured, per SP of user, on a service level basis (e.g.: FIG. 5, 5010), or on an IFC-AS level basis (e.g.: FIG. 6, 5315). In particular, the embodiments of this invention allow having different SIP timer's values, on a per SP basis, which can differ from the ones generally configured in a S-CSCF following the dictations of the RFC 3261 in respect to SIP timers.

As discussed earlier, the "service barring" value can be used for controlling by the S-CSCF whether the user shall be de-registered. It can take -as illustrated in the example of FIG. 7—a binary value. For example, the S-CSCF can check its value when receiving a message relating to a service of said user (e.g. a SIP message originating by the user, or intended to be terminated by the user), or can check it at certain time intervals, or can check it at reception of a message from the HSS via the "Cx" interface. For example, if the value is "false" then the registration of the user can be maintained by the S-CSCF, and if the value is "true" then the S-CSCF may execute the de-registration of the user.

The "Re-registration timer" can be used by the S-CSCF to control, on a user/SP profile basis the validity of an IMS registration of a user from a terminal. For example, the aforementioned 3GPP Specification 23.228 specifies on chapter 5.3.2.1 that a timer value is provided at initial registration of a user, and that said timer is refreshed at subsequent re-registrations. The embodiments provided by the present invention allows said "re-registration timer" to be set dynamically on a per SP of user basis.

As illustrated by the values relating to controlling rules shown in FIG. 7, a controlling rule can comprise other parameters (apart of the ones shown and described), which can similarly amount to a more flexible way of controlling services in a IMS, and which are currently set out within the S-CSCFs on a general basis.

Figure 8:
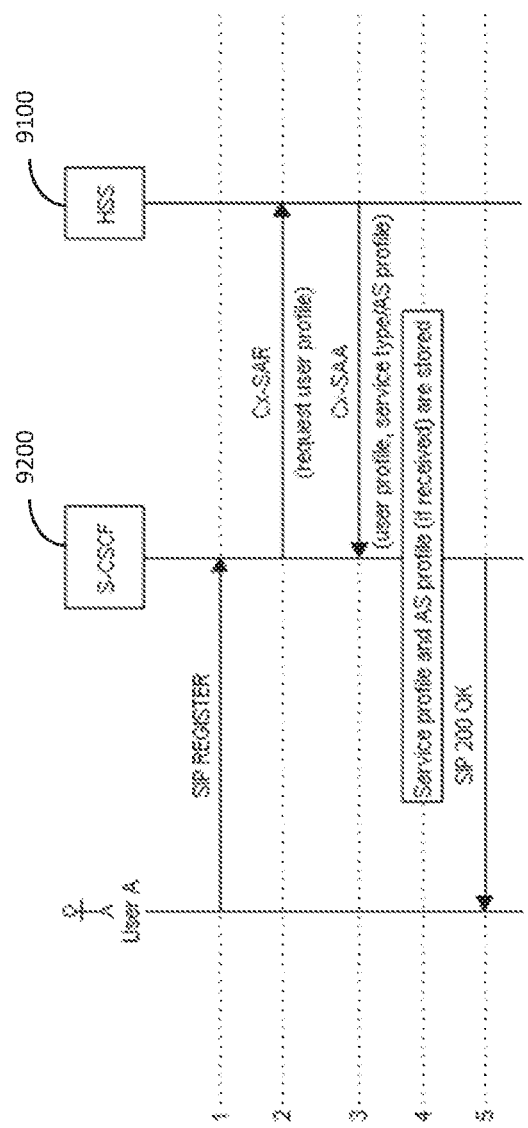
FIG. 8 shows a schematic signaling diagram example illustrating the transmission of the new Service Profile data from an HSS to a S-CSCF.

The FIGS. 3 and 8 illustrate, by means of signaling flows examples, how the solution disclosed herein can operate within an IMS so as to improve the controlling of services that can be processed therein.

The FIG. 8 shows a schematic signaling diagram illustrating the transmission (4210) of the relevant SP data of a user, comprising also the new SP data according to embodiments of this invention (4215), from an HSS to a S-CSCF.

FIG. 8—flows 1-2: Usual registration procedure takes place. The S-CSCF request the user profile from HSS.

FIG. 8—flow 3: The HSS responds with the service profile (SP) data of the user, which includes the list of IMS public identities, IFC/triggers/Application Servers and new information about the profile associated to each -eventual- AS in the list. For example, the SP data received from the HSS can comprise the new SP data (5010, 5315), which value identifies in the S-CSCF a controlling rule (710, 720).

FIG. 8—flows 4-5: The S-CSCF stores the information received. The new information (AS profiling) is linked to the list of IMS public identities relating to the concerned user. In particular, the S-CSCF may thereafter enforce the parameters making up the configured rule (710, 720) which value matches the value received within the new SP information received from the HSS in flow 3, in respect to the user concerned by the registration.

This can involve, for example, that in FIG. 8—flow 5, the S-CSCF provides back to the "user A" with a different re-registration timer from the one that might have been proposed by "user A" in the message of FIG. 8—flow 1.

Referring again to the FIG. 3, and in view of the features disclosed by the present invention, the following processing advantageous modifications are achieved:

The value of timer "C" started by the S-CSCF in FIG. 3—flow 6 (as well as other timers and parameters used to control services of a user by a S-CSCF), can be customized/adapted depending, for example, on the AS that might be involved in the signaling and/or depending on the general service profile related to a user. For example, this can be achieved by setting up a SP of a user comprising a new SP data (5010, 5315) which value maps to a controlling rule configured in a S-CSCF (710, 720). Accordingly, and in view of the illustrated example, the SIP timer "C" can take different values in respect to, either, any service relating to a certain user (5010), or in respect to certain AS(s) that might be involved in the processing of a service relating to certain users (5315). For example, the timer "C" can be started by the S-CSCF with the value of 4 seconds -instead of the standardized, and commonly applied value of 3 minutes- if the new SP value set up for a user is equal to value "1", which would then map to the controlling rule #1 (FIG. 7, 710) configured in the S-CSCF-.

This can provide the operator of a IMS network to configure a more specific control of services depending, for example, on the characteristics of the ASs that might be involved (e.g. based on: their geographical location, their processing characteristics, etc.), as well as based on certain user subscribed profiles (e.g. users that may require short responses to protocol messages, etc.).

As it is apparent, the value of any other timer (for example the "failover timer") that might intervene in the processing of a service for a user of the IMS could equally be dynamically adapted.

Figure 9:
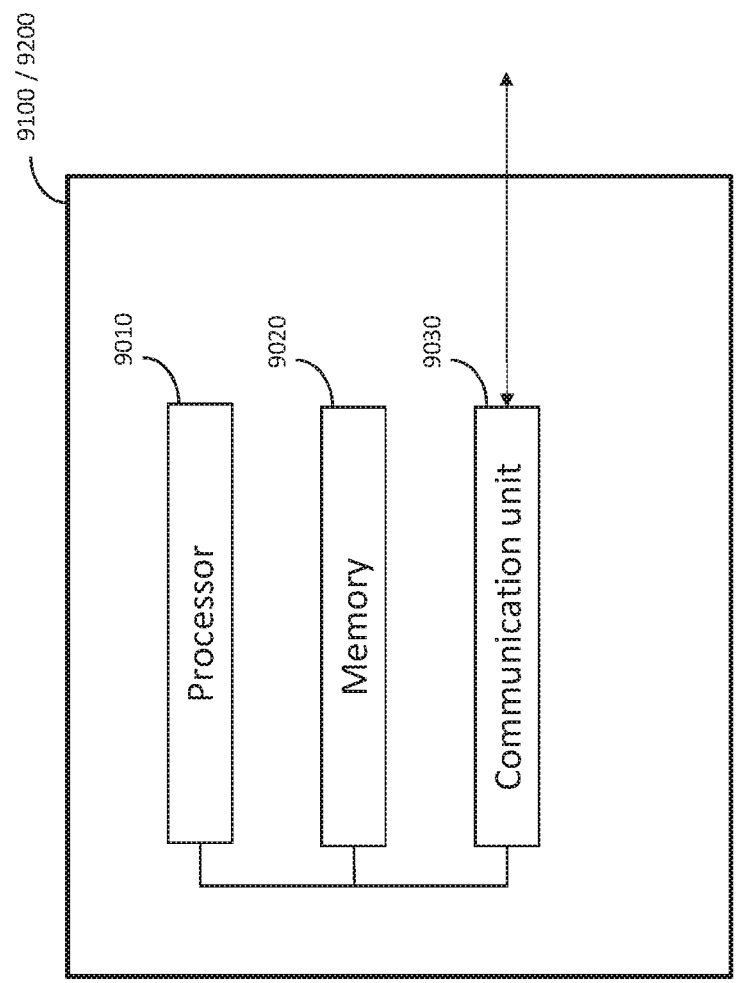
FIG. 9 shows embodiments in respect to an HSS server or a S-CSCF server.

The FIG. 9 shows embodiments in respect to an HSS server (9100) or a S-CSCF server (9200). In particular the FIG. 9 shows: a processor (9010), a memory (9020), and a communication unit (9030), as an example of the means for executing the methods described herein.

The memory (9020) in an HSS server (9100) can store computer instructions to be executed by the processor of the HSS (9010) so as to execute any of the processing steps referred above -e.g. with reference to FIG. 4- in respect to an HSS. The communication unit (9030) in a HSS server (9100) can, therefore, be further adapted to: receive configuration data in respect to the SP of a user further comprising a new SP data, which value identifies in the S-CSCF a controlling rule, said controlling rule comprising values for one or more timers for controlling by the S-CSCF a time associated to the processing of services of said user, and to transmit the SP data to a S-CSCF comprising the new SP data.

The memory (9020) in a S-CSCF server (9200) can store computer instructions to be executed by the processor of the S-CSCF (9020) so as to execute any of the processing steps referred above -e.g. with reference to FIG. 4- in respect to a S-CSCF. The communication unit (9030) in a S-CSCF server (9200) can, therefore, be further adapted to receive the SP data of a user further comprising a new SP data which value identifies in the S-CSCF a controlling rule, said controlling rule comprising values for one or more timers for controlling by the S-CSCF a time associated to the processing of services of said user.

According to the embodiments described above, the present invention encompasses a method for enhancing service processing in an IMS, and modifications in apparatuses for accomplishing with said method.

According to a very short summary, the method -in further details, and in respect to some embodiment- comprises: [1] configuring in the HSS that upholds the "IMS subscription" data of a user further data in respect to at least one of the SPs of said user and/or IFCs belonging to said SP, said further data comprising a concrete value; [2] configuring a S-CSCF with a set of one or more concrete values in respect to the values that can take said further data, and with one or more corresponding parameters to govern the behavior of the S-CSCF in respect to a service originated or terminated by the user; [3] transmitting from the HSS to the S-CSCF the "IMS subscription" data of a user also comprising the further data; and; [4] enforcing by the S-CSCF the corresponding parameters to govern the behavior of the S-CSCF in respect to a service originated or terminated by the user that match to the values of the further data that are received from the HSS in respect to a user.

The apparatus modifications comprise modifications in a server machine implementing an HSS, and modifications in a server machine implementing a S-CSCF server. This is briefly described below:

For example, the communications and processing means of an HSS server are to be modified. For example, the HSS can comprise: a processor, a memory storage storing -among other- computer instructions to be executed by the processor, and one or more communication units -e.g. implemented also by one or more processors, and by hardware wired or wireless interfaces- so as to receive and send communications; wherein said communication can involve: configuration communications (e.g. from an O&M server) as well as operational communications (e.g. communications with CSCFs of a IMS network). These means are adapted to fulfill with any of the embodiments described herein; e.g. by adapting the computer instructions to be executed by the processor.

For example, the communications and processing means of a S-CSCF server are to be modified. For example, the S-CSCF can comprise: a processor, a memory storage storing -among other- computer instructions to be executed by the processor, and one or more communication units -e.g. implemented also by one or more processors, and by hardware wired or wireless interfaces- so as to receive and send communications; wherein said communication can involve: configuration communications (e.g. from an O&M server) as well as operational communications (e.g.: communications with a HSS of a IMS network, communications with user terminals that originate and/or terminate services, and with the ASs that should mediate in the processing of said services). These means are adapted to fulfill with any of the embodiments described herein; e.g. by adapting the computer instructions to be executed by the processor.

Even though embodiments for accomplishing with the various aspects of the present invention have been described, many different alterations and the like thereof will become apparent to those skilled in the art. The described embodiments are therefore not intended to limit the scope of the present invention.

The invention claimed is:

1. A method, implemented by a Serving Call Session Control Function (S-CSCF) server in an Internet Protocol Multimedia Subsystem (IMS), the method comprising:
receiving, from a Home Subscriber Server (HSS) in the IMS, a service profile corresponding to a subscription of a user;
using the service profile to identify a rule comprising a timer value;
controlling processing of a service associated with the user by setting a timer associated with the service at the S-CSCF in accordance with the timer value.

2. The method of claim 1, wherein:
the rule further comprises a service barring value associated with the timer value; and
the method further comprises controlling deregistration of the user in accordance with the service barring value.

3. The method of claim 1, wherein controlling the processing of the service comprises controlling, in accordance with the timer value, SIP messages supporting the service, wherein the service is originated by or terminated in the user.

4. The method of claim 1, wherein controlling the processing of the service comprises controlling, in accordance with the timer value, a time in which the user is required to reregister in the IMS.

5. The method of claim 1, wherein controlling the processing of the service comprises controlling, in accordance with the timer value, a validity of an Original Dialog Identifier.

6. The method of claim 1, wherein receiving the service profile from the HSS comprises receiving an attribute in an information element that directly belongs to a data class defining the service profile, and the method further comprises configuring the rule with a rule value that maps to an integer value of the attribute.

7. The method of claim 1, wherein:
receiving the service profile from the HSS comprises receiving an attribute in an information element that belongs to a data class that defines an Initial Filter Criteria;
the data class belongs to a further data class that defines the service profile; and
the method further comprises configuring the rule with a rule value that maps to a value of the attribute.

8. A method, implemented by a Home Subscribed Server (HSS) in an Internet Protocol Multimedia Subsystem (IMS), the method comprising:
store a service profile corresponding to a subscription of a user;
configure the service profile with data used by a Serving Call Session Control Function (S-CSCF) of the IMS;
set, in the S-CSCF, a timer that controls processing of a service of the user by transmitting the service profile to the S-CSCF.

9. The method of claim 8, wherein setting the timer that controls the processing of the service comprises setting a deregistration timer of the user in accordance with a service barring value.

10. The method of claim 8, wherein setting the timer that controls the processing of the service comprises setting a SIP message timer supporting the service, wherein the service is originated by or terminated in the user.

11. The method of claim 8, wherein setting the timer that controls the processing of the service comprises setting a reregistration timer tracking a time in which the user is required to reregister in the IMS.

12. The method of claim 8, wherein setting the timer that controls the processing of the service comprises setting a validity timer of an Original Dialog Identifier.

13. The method of claim 8, wherein transmitting the service profile comprises transmitting an attribute in an information element that directly belongs to a data class defining the service profile.

14. The method of claim 8, wherein transmitting the service profile comprises transmitting an attribute in an information element that belongs to a data class that defines an Initial Filter Criteria, and the data class belongs to a further data class that defines the SP.

15. An apparatus, implementing a Serving Call Session Control Function (S-CSCF), comprising:
processing circuitry;
memory containing instructions executable by the processing circuitry whereby the processing circuitry is configured to:
receive, from a Home Subscriber Server (HSS) in an Internet Protocol Multimedia Subsystem (IMS) comprising the S-CSCF, a service profile corresponding to a subscription of a user;
use the service profile to identify a rule comprising a timer value;
control, in accordance with the timer value, processing of a service associated with the user by setting a timer associated with the service at the S-CSCF.

16. An apparatus, implementing a Home Subscriber Server (HSS), comprising:
processing circuitry;
memory containing instructions executable by the processing circuitry whereby the processing circuitry is configured to:
store a service profile corresponding to a subscription of a user in the memory;
configure the service profile with data used by a Serving Call Session Control Function (S-CSCF) of an Internet Protocol Multimedia System (IMS) comprising the HSS;
set, in the S-CSCF, a timer that controls processing of a service of the user by transmitting the service profile to the S-CSCF.

17. A system comprising:
a first server implementing a Home Subscriber Server (HSS), the first server comprising processing circuitry configured to:
store a service profile corresponding to a subscription of a user in a memory;
configure the service profile with data used by a Serving Call Session Control Function (S-CSCF) of an Internet Protocol Multimedia System (IMS) comprising the HSS;
set, in the S-CSCF, a timer that controls processing of a service of the user by transmitting the service profile to the S-CSCF;
a second server implementing the S-CSCF, the second server comprising other processing circuitry configured to:
receive the service profile from the HSS;
use the service profile to identify a rule comprising a timer value;
control processing of the service associated with the user by setting the timer in accordance with the timer value.

* * * * *